Patented July 22, 1924.

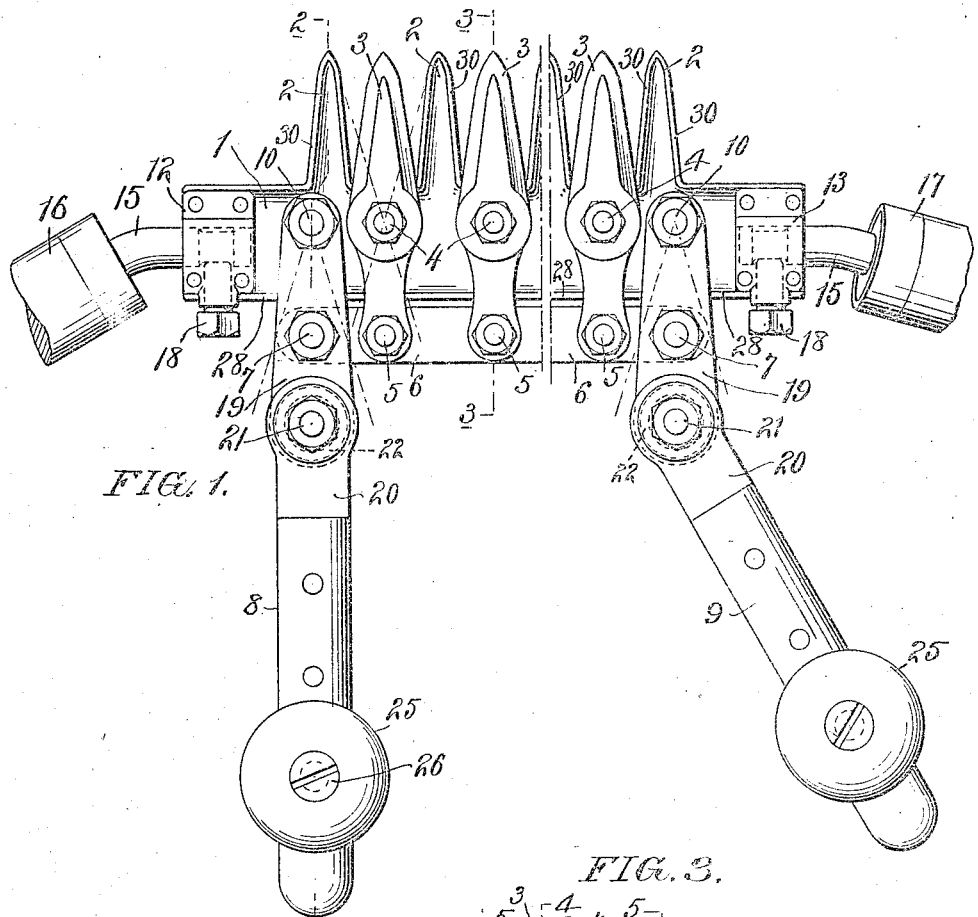

1,502,331

UNITED STATES PATENT OFFICE.

ALFRED F. BISHOP, OF AUDUBON, NEW JERSEY.

SHRUBBERY CLIPPER.

Application filed August 3, 1922. Serial No. 579,377.

*To all whom it may concern:*

Be it known that I, ALFRED F. BISHOP, a citizen of the United States, residing at Audubon, in the county of Camden and State of New Jersey, have invented certain new and useful Improvements in a Shrubbery Clipper, of which the following is a specification.

My invention relates to improvements in clippers for trimming shrubbery and the like. The object of my invention is to construct a clipper which may be easily operated and which will be light in weight, adapting the same for use on large hedges whereby the trimming of the hedge may be done quickly and uniformly; a further object of my invention is to form the main base bar having the fixed cutting blades formed thereon of pressed steel. The base bar and the blades are of concaved formation with upstanding edges, thus forming a rigid construction which is light in weight, the upstanding edges extending around the fixed blades and forming the cutting edges; a further object of my invention is to provide separate loosely pivoted blades upon the base bar, which are adapted to tilt slightly during the cutting action and thus impinge tightly upon the upstanding cutting edges of the fixed blades, and thus forming an effective cutting action; a still further object of my invention is to provide fastening devices upon either end of the base bar in which may be adjustably secured handles for supporting the clipper either by one or two persons, and also provide operating handles by which the pivoted blades may be operated from either end of the base bar; said operating handles being adjustable radially and provided with rotatable hand grips for the convenient operation of the device.

Referring to the accompanying drawing, Fig. 1 is a plan view of my improved clipper; Fig. 2 is a vertical section on line 2—2, Fig. 1; Fig. 3 is a vertical section on line 3—3, Fig. 1; Fig. 4 is a vertical section on line 4—4, Fig. 3; and Fig. 5 is a vertical section on line 5—5, Fig. 3.

In the drawing, in which like reference characters refer to like parts, 1 represents the base bar having the fixed blades 2 formed thereon. Upon the base bar 1 are pivotally mounted the blades 3, which co-operate with the blades 2 and form the cutting action. Bolts 4 are provided for pivotally attaching the blades 3 to the base bar 1.

The pivoted blades 3 are all pivotally attached, by bolts 5, to a connecting bar 6, which latter is pivotally connected, by bolts 7, with the operating handles 8 and 9, which in turn are pivotally attached to the base bar 1, adjacent to either end of the latter, by the bolts 10.

The base bar 1 is provided with fastening devices 12 and 13, secured at either end thereof, consisting of brackets having sockets formed therein adapted to receive the shanks 15 of the supporting handles 16 or 17. Said brackets are provided with set screws 18 for detachably securing the shanks 15 in the brackets, making either of the handles 16 or 17 readily removable. Said shanks 15 are bent slightly so that the handles may be set at various angles in relation to the base bar 1.

The operating arms or handles 8 and 9 are each made in two sections 19 and 20, which are secured together by a bolt 21, by which the section 20 may be placed in various radial positions in relation to the supporting handle 16 or 17. The section 19 of the handle 8 or 9 is provided with a conical boss 22. The opposite section 20 is provided with a conical recess 23, which is occupied by the boss 22 and said sections 19 and 20 are adapted to be tightly clamped together by the bolt 21, after the handle section 20 is set at the desired angle in relation to the section 19.

The handle section 20 is provided with a knob 25 forming a suitable hand grip, which knob is rotatably mounted upon a pin 26 secured in the handle section 20.

The base bar 1, having the fixed blades 2 formed thereon, is pressed from sheet metal. Formed upon the base bar 1 are up-standing edges 28 and 30. The edge 28 extends throughout the length of the base bar 1 and forms a stiffening member for giving rigidity to the bar 1 and permitting the same to be of sufficient length for trimming wide hedges and also permitting the base bar to be of light construction. The upstanding edge 30 formed on the base bar 1 extends around the blades 2 and thus forms the cutting edges on said blades 2. Each blade 2 is of hollow or concaved formation between the cutting edges 30, whereby the material when cut will more readily free itself from the blades and thus prevent the blades from clogging and binding.

The pivoted blades 3 are each provided with a rounded under surface 32 located at the cross-section of the blade 3 which rests upon the longitudinal upstanding edge 28 of the base bar 1, as shown in Fig. 4. Said edge 28 forms a bearing surface upon which this rounded surface 32 of the pivoted blade 3 may rock during the cutting action. The pivot bolt 4 by which the blade 3 is pivoted to the base bar 1 is sufficiently loose, as is also the bolt 5 which connects the blade 3 with the connecting bar 6, to permit the blade 3 to have a slight rocking movement. The pushing and pulling action of the connecting bar 6 will tend to rock the pivoted blades 3, causing the double cutting edges of each pivoted blade 3 to tightly impinge upon the cutting edge 30, of first one fixed blade 2 and then the next adjacent fixed blade 2, thus giving a very effective cutting action to the blades.

The handles 16 and 17, located at opposite ends of the clipper, adapt it for use by two persons standing on opposite sides of a hedge, whereby the clipper may be supported by the handles 16 and 17 and the cutting blades operated from either end by the pivoted arms or handles 8 or 9, which handles may be adjusted radially to any convenient operating position. When the clipper is used by one person the handles at one end of the clipper may be detached and the cutting blades operated from one end of the clipper making the same adaptable for use by one person.

Having thus described my invention, I claim and desire to secure by Letters Patent:

1. A clipper having a base bar, fixed blades upon the base bar, said blades having double cutting edges thereon, movable blades loosely pivoted upon the base bar having double cutting edges adapted to co-act with two adjacent fixed blades, a rib upon the base bar forming a bearing surface for the movable blades tending to press the cutting edge of the movable blades against the cutting edge of the fixed blades during the cutting action, a connecting bar to which the movable blades are operably associated, and a part for reciprocating the connecting bar.

2. A clipper comprising a base bar formed of pressed metal, a rib formed upon one longitudinal edge of the base bar, blades formed upon the opposite longitudinal edge of the base bar, said blades having cutting edges formed at opposite edges thereof, blades pivotally mounted upon the base bar and positioned upon the base bar in alignment with the space between two adjacent blades of the base bar, said pivoted blades having double cutting edges thereon adapted to co-act with two adjacent blades of the base bar, a connecting bar to which the pivoted blades are operatively connected, said pivoted blades having rounded surfaces thereon adapted to be supported upon said longitudinal rib and have a slight rocking motion thereon when actuated by the connecting bar, and a part for reciprocating the connecting bar.

3. A clipper comprising a base bar, fixed blades formed upon the base bar, blades movably mounted upon the base bar adapted to co-act with said fixed blades, said base bar formed of pressed metal with a stiffening edge formed thereon extending longitudinally of the base bar, brackets upon opposite ends of the base bar, handles adapted to be detachably secured in said brackets, arms pivotally mounted upon the base bar at opposite ends of the latter, a connecting bar pivotally connecting said arms, said movable blades operatively associated with the connecting bar, and handles detachably mounted upon said arms for operating the movable blades.

In testimony whereof I affix my signature.

ALFRED F. BISHOP.